US012748368B2

(12) United States Patent
Umemura et al.

(10) Patent No.: US 12,748,368 B2
(45) Date of Patent: Sep. 29, 2026

(54) HEATER INCLUDING A HEATING WIRE HAVING A ZIG-ZAG SHAPE, AND A FIXING DEVICE, AN IMAGE FORMATION DEVICE, AND A HEATING DEVICE WITH SUCH A HEATER

(71) Applicant: Misuzu Industry Co., Ltd., Komaki (JP)

(72) Inventors: Yuji Umemura, Komaki (JP); Yukio Fujita, Komaki (JP); Mayo Kamegai, Komaki (JP); Kenta Kobayashi, Komaki (JP)

(73) Assignee: Misuzu Industry Co., Ltd., Komaki (JP)

( * ) Notice: Subject to any disclaimer, the term of this patent is extended or adjusted under 35 U.S.C. 154(b) by 0 days.

(21) Appl. No.: 18/874,348

(22) PCT Filed: Jun. 23, 2023

(86) PCT No.: PCT/JP2023/023329
§ 371 (c)(1),
(2) Date: Dec. 12, 2024

(87) PCT Pub. No.: WO2024/018826
PCT Pub. Date: Jan. 25, 2024

(65) Prior Publication Data

US 2025/0377617 A1 Dec. 11, 2025

(30) Foreign Application Priority Data

Jul. 22, 2022 (JP) ................................ 2022-117504

(51) Int. Cl.

| | |
|---|---|
| ***G03G 15/20*** | (2006.01) |
| ***H05B 3/00*** | (2006.01) |
| ***H05B 3/06*** | (2006.01) |
| ***H05B 3/12*** | (2006.01) |
| ***H05B 3/16*** | (2006.01) |
| ***H05B 3/56*** | (2006.01) |

(52) U.S. Cl.
CPC ..... *G03G 15/2053* (2013.01); *G03G 15/2064* (2013.01); *H05B 3/0095* (2013.01);
(Continued)

(58) Field of Classification Search
USPC ........................................................ 399/333
See application file for complete search history.

(56) References Cited

U.S. PATENT DOCUMENTS 5,958,269 A * 9/1999 Suzuki ................ H05B 3/0095
310/236
7,417,206 B2 8/2008 Nakamura
(Continued)

FOREIGN PATENT DOCUMENTS

CN 107535017 A 1/2018
JP 2002-141159 A 5/2002
(Continued)

OTHER PUBLICATIONS

International Search Report issued Aug. 29, 2023 in PCT Application No. PCT/JP2023/023329 filed Jun. 23, 2023, 2 pages.
(Continued)

*Primary Examiner* — Quana Grainger
(74) *Attorney, Agent, or Firm* — Oblon, McClelland, Maier & Neustadt, L.L.P.

(57) ABSTRACT

A heater includes a plurality of heat-generating cells partitioned by a boundary line arranged on a base body, and includes one resistive heating wire formed in each heat-generating cell and having a zig-zag shape as a whole, the resistive heating wire formed by connecting a parallel wiring and a turn-back wiring formed so as to turn back the parallel wiring in a vicinity of the boundary line between adjacent heat-generating cells. In the adjacent heat-generating cells, the resistive heating wire of a heat-generating cell has an extension portion extending the parallel wiring past the
(Continued)

boundary line, and the resistive heating wire of the other heat-generating cell is shortened or deformed so that a wiring of a portion facing the extension portion maintains an electrical insulation with the extension portion. The resistive heating wires of the adjacent heat-generating cells include extension portions alternately in a boundary line direction.

16 Claims, 7 Drawing Sheets

(52) U.S. Cl.
CPC ................. *H05B 3/06* (2013.01); *H05B 3/12* (2013.01); *H05B 3/16* (2013.01); *H05B 3/56* (2013.01); *H05B 2203/004* (2013.01)

(56) References Cited

U.S. PATENT DOCUMENTS

| | | | | |
|---|---|---|---|---|
| 9,098,033 | B2 * | 8/2015 | Shimura ............ | G03G 15/2042 |
| 11,991,789 | B2 | 5/2024 | Umemura et al. | |
| 2006/0000822 | A1 | 1/2006 | Nakamura | |
| 2006/0096972 | A1 | 5/2006 | Nakamura | |
| 2021/0176825 | A1 | 6/2021 | Umemura et al. | |
| 2024/0260139 | A1 | 8/2024 | Umemura et al. | |

FOREIGN PATENT DOCUMENTS

| | | | |
|---|---|---|---|
| TW | 200618663 | | 6/2006 |
| TW | 201538027 | A | 10/2015 |
| WO | WO 2013/073276 | A1 | 5/2013 |
| WO | WO 2017/090692 | A1 | 6/2017 |
| WO | WO 2019/112058 | A1 | 6/2019 |

OTHER PUBLICATIONS

Taiwanese Office Action issued May 15, 2024 in TW 112126208, 12 pages (with English Translation).
Taiwanese Search Report completed May 14, 2024 in TW 112126208, filed Jul. 13, 2012, 2 pages (with English Translation).

* cited by examiner

HEATER INCLUDING A HEATING WIRE HAVING A ZIG-ZAG SHAPE, AND A FIXING DEVICE, AN IMAGE FORMATION DEVICE, AND A HEATING DEVICE WITH SUCH A HEATER

TECHNICAL FIELD

The present invention relates to a heater, a fixing device, an image formation device, and a heating device. Specifically, the present invention relates to a heater including a plurality of heat-generating cells and having high heat uniformity, and a fixing device, an image formation device, and a heating device, which are equipped with such a heater.

BACKGROUND ART

As a heating means for performing heat treatment of an object, a heater in which a heat-generating cell that generates heat by energization is provided on a substrate is known. Since such a heater can be made thin and compact, for example, the heater is used for fixing applications such as a copying machine and a printer, or is used by being incorporated in a dryer that heats and dries a processing body such as a panel. In these applications, a heater including a plurality of heat-generating cells electrically connected in parallel and being capable of uniformizing temperature distribution in a heat generating surface is disclosed (see e.g., Patent Literatures 1 to 3).

CITATIONS LIST

Patent Literature

Patent Literature 1: WO 2013/073276 A1
Patent Literature 2: WO 2017/090692 A1
Patent Literature 3: WO 2019/112058 A1

SUMMARY OF INVENTION

Technical Problems

A heater that heats an object-to-be-heated in a state of facing a base body is known. For example, a heater is disclosed in which a plurality of heat-generating cells are provided on one base body, and each heat-generating cell is provided with a resistive heating wire having a zig-zag shape (see e.g., Patent Literature 1). In this heater, a resistance heat generating material having a positive temperature coefficient of resistance is used, and heat-generating cells are electrically connected in parallel, so that temperatures can be autonomously made uniform with each other, and a heater that has uniform heat in the longitudinal direction can be obtained. In addition, excessive temperature rise of a specific heat-generating cell can be prevented.

Furthermore, in an application in which an object-to-be-heated is swept with respect to a base body, the heater described in Patent Literature 1 has, as illustrated in FIG. 16, a non-forming portion I of a resistive heating wire, which is a gap between heat-generating cells, inclined with respect to the longitudinal direction of the heater, and thus the influence of the drop of heat generation due to the non-forming portion I of the resistive heating wire 30 with respect to the sweep direction W is alleviated.

However, recently, heat uniformity between adjacent heat-generating cells is required at a much higher level. In addition, there is a demand for a heater that is extremely narrow in the sweep direction. Therefore, even if the heater as disclosed in Patent Literature 1 is simply cut so as to be narrower in the sweep direction, it is difficult to sufficiently alleviate the influence of the drop of heat generation due to the non-forming portion with respect to the sweep direction.

Therefore, the inventors of the present application have proposed a heater in which gaps between heat-generating cells are dispersed by intertwining resistive heating wire patterns between adjacent heat-generating cells with each other (Patent Literature 2). Furthermore, a heater capable of filling a thermal blank generated between heat-generating cells by forming a turn-back portion in a zig-zag shape into a pattern in which a lateral wiring and an oblique wiring are connected has been proposed (Patent Literature 3). As a result, even a heater narrow in the sweep direction can achieve excellent heat uniformity. However, there are heaters that are difficult to adopt these configurations, and higher heat uniformity have been required. For this reason, it is necessary to be able to be applied to heaters of more various forms, and to improve heat uniformity between a plurality of heat-generating cells. Furthermore, it is strongly desired to uniformize heat when an available temperature is achieved after energization of the heater, that is, to quickly uniformize heat after energization.

The present invention has been made in view of the above problems, and an object of the present invention is to provide a heater in which heat generation property at a boundary portion between a plurality of heat-generating cells is improved to improve heat uniformity of the entire heater. Furthermore, an object is to provide a fixing device, an image formation device, and a heating device, which are equipped with such a heater.

Solutions to Problems

The present invention is as follows.

1. The main point relates to a heater in which a plurality of heat-generating cells partitioned by a virtual boundary line are arranged side by side on a base body, the heater configured to heat an object-to-be-heated in a state of facing the base body, the heater comprising:

the base body, and one resistive heating wire formed in each of the heat-generating cells and having a zig-zag shape as a whole, the resistive heating wire being formed by connecting a parallel wiring in which a plurality of wirings are formed in parallel and a turn-back wiring formed so as to turn back the parallel wiring in a vicinity of the boundary line between adjacent ones of the heat-generating cells, wherein in the adjacent ones of the heat-generating cells, the resistive heating wire of one of the heat-generating cells has an extension portion formed so as to extend the parallel wiring past the boundary line, and the resistive heating wire of the other of the heat-generating cells is shortened or deformed so that a wiring of a portion facing the extension portion maintains an electrical insulation with the extension portion, and the resistive heating wires of the adjacent ones of the heat-generating cells include the extension portions alternately in a boundary line direction.

2. The main point is that in the heater according to 1. described above, the extension portion of the resistive heating wire straddles the boundary line, and a whole or a part of the extension portion is provided inclined at a predetermined angle with respect to the boundary line.

3. The main point is that in the heater according to 1, or 2. described above, the resistive heating wire has a curved portion in the parallel wiring, and the curved portion is formed in a convex shape toward a gap between the resistive heating wires of the adjacent ones of the heat-generating cells.

4. The main point is that in the heater according to 1, or 2. described above, the plurality of heat-generating cells are arranged side by side in one linear direction.

5. The main point is that in the heater according to 4. described above, the boundary line between the adjacent ones of the heat-generating cells is inclined at a predetermined angle with respect to the one straight line.

6. The main point is that in the heater according to 4. described above, the resistive heating wire has a curved portion in the parallel wiring, and the curved portion is formed in a convex shape toward a gap between the resistive heating wires of the adjacent ones of the heat-generating cells.

7. The main point is that in the heater according to 4. described above, the turn-back wiring is formed substantially parallel to the boundary line between the adjacent heat-generating cells.

For reference, in the heater according to 4. described above, the resistive heating wire of each of the heat-generating cells can receive power supply separately.

8. The main point is that in the heater according to 4. described above, the base body and the object-to-be-heated are relatively swept in a direction perpendicular to the one straight line to heat the object-to-be-heated.

9. The main point is that in the heater according to 1, or 2. described above, the plurality of heat-generating cells are arranged side by side in a circumferential direction of one circle.

10. The main point is that in the heater according to 9. described above, the boundary line between adjacent ones of the heat-generating cells equally divides the one circle around a center.

11. The main point is that in the heater according to 9. described above, the boundary line between the adjacent ones of the heat-generating cells is inclined at a predetermined angle with respect to a line segment that equally divides the one circle around the center.

For reference, in the heater according to 9. described above, the resistive heating wire has a curved portion in the parallel wiring, and the curved portion can be formed in a convex shape toward a gap between the resistive heating wires of the adjacent ones of the heat-generating cells.

Furthermore, in the heater according to 9. described above, the turn-back wiring can be formed substantially in parallel with the boundary line between the adjacent ones of the heat-generating cells.

Moreover, in the heater according to 9. described above, the turn-back wiring can be formed in a circumferential direction of the one circle at an upper end portion or a lower end portion in the boundary line direction.

Furthermore, in the heater according to 9. described above, the resistive heating wire of each of the heat-generating cells can receive power supply separately.

12. The main point is that a fixing device includes the heater according to any one of 1. to 11.

13. The main point is that an image formation device includes the heater according to any one of 1. to 11.

14. The main point is that a heating device includes the heater according to any one of 1. to 11.

Advantageous Effects of Invention

According to the heater of the present invention, there is provided a heater in which a plurality of heat-generating cells partitioned by a virtual boundary line are arranged side by side on a base body, the heater configured to heat an object-to-be-heated in a state of facing the base body, the heater including the base body, and one resistive heating wire formed in each of the heat-generating cells and having a zig-zag shape as a whole, the resistive heating wire being formed by connecting a parallel wiring in which a plurality of wirings are formed in parallel and a turn-back wiring formed so as to turn back the parallel wiring in a vicinity of the boundary line between adjacent ones of the heat-generating cells, wherein in the adjacent ones of the heat-generating cells, the resistive heating wire of one of the heat-generating cells has an extension portion formed so as to extend the parallel wiring past the boundary line, and the resistive heating wire of the other of the heat-generating cell is shortened or deformed so that a wiring of a portion facing the extension portion maintains an electrical insulation with the extension portion, and the resistive heating wires of the adjacent ones of the heat-generating cells include the extension portions alternately in a boundary line direction, whereby heat generating property of the boundary region is greatly improved by the intertwined resistive heating wires across the boundary line between the adjacent heat-generating cells, and an extremely high heat uniformity of the entire heater can be obtained. In addition, the heat uniformity when an available temperature is achieved after the heater is energized is improved. That is, since the heat generating property of the boundary region between the heat-generating cells is improved, the temperature of the boundary portion rapidly increases after the energization, and highly uniform heating performance can be exhibited from the time of starting the heater.

In a case where the extension portions of the resistive heating wires straddle the boundary line, and all or a part of the extension portion is provided to be inclined at a predetermined angle with respect to the boundary line, more intertwined resistive heating wires of the adjacent heat-generating cells can be obtained by the inclined extension portions, and the heat generating range in the boundary region can be widened, thereby effectively preventing temperature fall.

When the resistive heating wire has a curved portion in the parallel wiring, and the curved portion is formed in a convex shape toward a gap between the resistive heating wires of the adjacent heat-generating cells, the resistive heating wire is formed so as to fill the gap between the wirings of the adjacent heat-generating cells by the curved portion, and uniformity of heat generation in the boundary region can be further improved.

When the plurality of heat-generating cells are arranged side by side in the direction of one straight line, a heater having a heating portion that is long in one direction and has high heat uniformity over the entire length can be configured.

When the boundary line between the adjacent heat-generating cells is inclined at a predetermined angle with respect to the one straight line, the non-heating portions between the adjacent heat-generating cells can be prevented from being aligned in the direction perpendicular to the one straight line, and in particular, when the heater and the object-to-be-heated relatively move in the perpendicular direction, uniform heating can be applied to the object-to-be-heated.

When the resistive heating wire has a curved portion in the parallel wiring, and the curved portion is formed in a convex shape toward a gap between the resistive heating wires of the adjacent heat-generating cells, the resistive heating wire is formed so as to fill the gap between the wirings of the adjacent heat-generating cells by the curved portion, and uniformity of heat generation in the boundary region can be further improved.

Note that when the turn-back wiring is formed substantially parallel to the boundary line with the adjacent heat-generating cell, the turn-back wiring can be suitably connected to the wiring of the extension portion and the wiring of the portion facing thereto.

In a case where the turn-back wiring is formed in parallel with the one straight line at the upper end portion or the lower end portion in the boundary line direction, the non-heating portions between adjacent heat-generating cells can be reduced at the end portion in the boundary line direction.

Note that when the resistive heating wire of each of the heat-generating cells separately receives power supply, heat generation of each heat-generating cell can be controlled. Furthermore, the temperature of each heat-generating cell is uniformized, and uniform heating performance can be obtained over the entire heater by electrically connecting the resistive heating wires of the plurality of heat-generating cells in parallel.

When the object-to-be-heated is heated by relatively sweeping the base body and the object-to-be-heated in a direction perpendicular to the one straight line, an object long in a direction perpendicular to the one straight line can be heated with a heater having a narrow width in the perpendicular direction.

When the plurality of heat-generating cells are arranged side by side in the circumferential direction of one circle, the plurality of heat-generating cells can be suitably arranged on a base body having a disk shape or the like, and a heater having a heating portion with high heat uniformity over the entire circumference can be configured.

In addition, even in a case where the heat-generating cells are arranged side by side in the circumferential direction of one circle, it is possible to obtain a similar effect by applying a configuration similar to a case where the heat-generating cells are arranged side by side in the direction of one straight line.

BRIEF DESCRIPTION OF DRAWINGS

FIG. 11 is a graph showing an example of temperature distribution of a heater immediately after power is turned on.

DESCRIPTION OF EMBODIMENT

Figure 1:
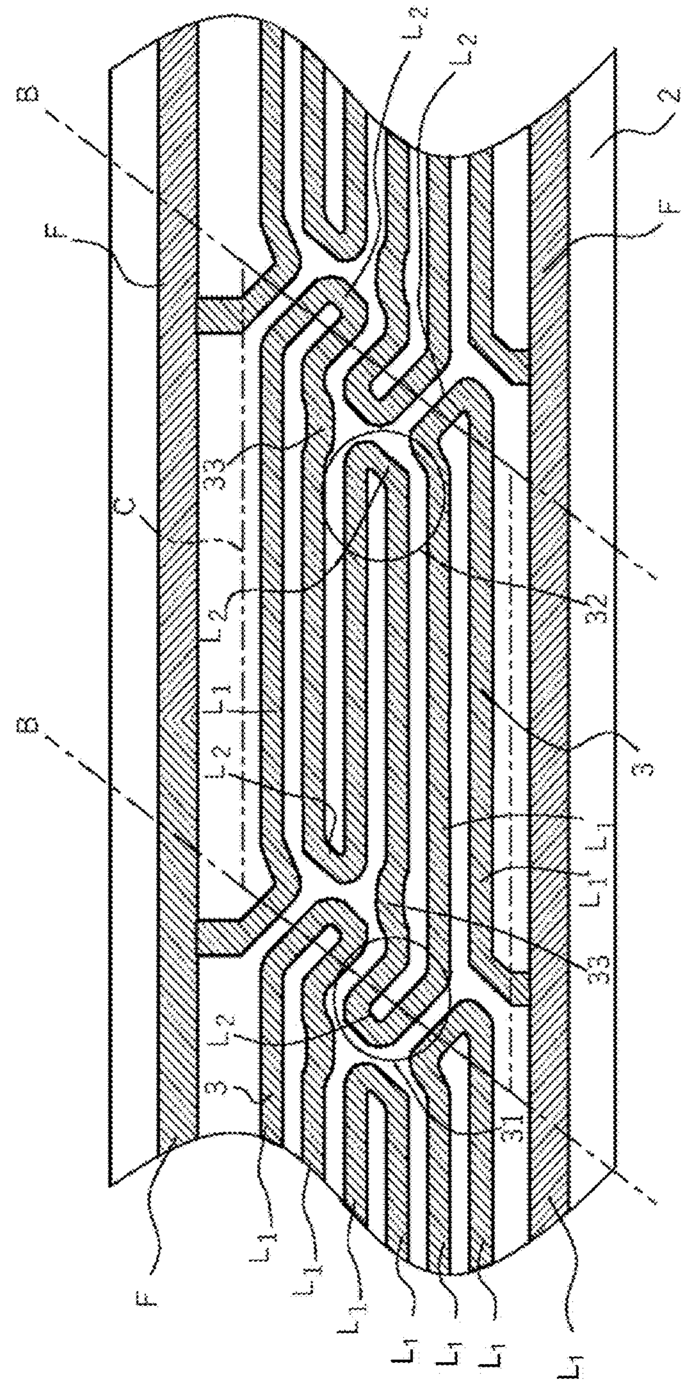
FIG. 1 is a schematic plan view illustrating a basic configuration of a heater.

Hereinafter, the present invention will be described in detail with reference to the drawings.

1. Heater

A heater (1) according to a present embodiment is a heater in which a plurality of heat-generating cells (C) partitioned by a virtual boundary line (B) are arranged side by side on a base body (2) and which heats an object-to-be-heated in a state of facing the base body (2). The heater (1) includes the base body (2) and a resistive heating wire (3) formed in each heat-generating cell (C) (see FIGS. 1 and 2).

In addition, one or more pairs of power supply wirings (F) for supplying power to each heat-generating cell (C), a power supply terminal for connecting to an external power supply, a temperature sensor, and the like can be provided on the base body (2). Note that a power supply wiring may be provided in the heat-generating cell itself.

The heater (1) may heat an object-to-be-heated while fixing a positional relationship with the object-to-be-heated, or may heat the object-to-be-heated by moving one or both of the heater and the object-to-be-heated and relatively sweeping the heater and the object-to-be-heated.

(Base Body)

The base body (2) is a substrate that supports the plurality of heat-generating cells (C). The surface shape of the base body (2) is not particularly limited, and may be, for example, a rectangular shape (see FIG. 2), a circular shape (see FIG. 3), or the like, but is not limited thereto, and any shape such as a square shape, an L shape, an arc shape, or a fan shape can be selected according to the application. In addition, the thickness of the base body (2) may be determined according to its material, planar dimensions, required strength, and the like.

In an application in which an object-to-be-heated and the heater (1) are relatively swept in a sweep direction to heat the object-to-be-heated in a state in which the heat generating surface of the heater (1) and the object-to-be-heated face each other, the cross-sectional shape of the base body (2) in the sweep direction may be a planar shape or an arc shape (i.e., a shape obtained by cutting a circular column or a cylinder along a plane parallel to the central axis) convex toward the opposite side to the object-to-be-heated with an axis orthogonal to the sweep direction as the center. In this case, each resistance heat generating wiring can be disposed on a convex surface or can be disposed on a surface on the opposite side (concave surface). With such a shape, it is possible to efficiently heat the object-to-be-heated swept on a roll by attaching the heater to the cylindrical roll and rotating the roll.

The material constituting the base body (2) is not limited, and for example, metals, ceramics, composite materials thereof, and the like can be used.

Examples of the metal constituting the base body (2) include steel, and among them, stainless steel can be suitably used. The type of the stainless steel is not particularly limited, and ferritic stainless steel and/or austenitic stainless steel are preferable. Among these stainless steels, a variety having excellent heat resistance and/or oxidation resistance is particularly preferable. Examples thereof include SUS430, SUS436, SUS444, and SUS316L. Only one type thereof may be used, or two or more types may be used in combination.

As the metal constituting the base body (2), aluminum, magnesium, copper, and alloys of these metals can be used. Only one type thereof may be used, or two or more types may be used in combination. Among them, aluminum, magnesium, and alloys thereof (aluminum alloy, magnesium alloy, Al—Mg alloy, etc.) have small specific gravities, and thus the weight of the heater can be reduced by adopting these materials. In addition, since copper and an alloy thereof are excellent in thermal conductivity, heat uniformity of the heater can be improved by adopting these materials.

When a conductive material such as metal is used as the material of the base body (2), the base body (2) is configured by providing an insulating layer on the conductive material for electrical insulation between the conductive material and wiring (resistive heating wire, power supply wiring, power supply terminal, etc.) provided thereon. In this case, the heat-generating cell is formed on the insulating layer.

The material of the insulating layer is not particularly limited, but for example, glass, ceramics, glass/ceramics, and the like are preferable. Among them, when metal (stainless steel etc.) is used as the material constituting the base body (2), glass is preferable as the material of the insulating layer, and crystallized glass and semi-crystallized glass are more preferable from the viewpoint of the thermal expansion balance. Specifically, $SiO_2$—$Al_2O_3$-MO-based glass is preferable. Here, MO is an oxide of alkaline earth metal (MgO, CaO, BaO, SrO, etc.). The thickness of the insulating layer is not particularly limited (e.g., about 30 to 200 μm).

In addition, in a case of constituting the base body (2) using ceramics, the material of the base body may be any material as long as it can achieve electrical insulation with the wiring (resistive heating wire, power supply wiring, power supply terminal, etc.) provided thereon. Preferable examples of the material of the base body include aluminum oxide, aluminum nitride, zirconia, silica, mullite, spinel, cordierite, and silicon nitride. Only one type thereof may be used, or two or more types may be used in combination. Among them, aluminum oxide and aluminum nitride are more preferable.

Furthermore, a composite material of a metal and a ceramic can also be used as the base body (2). Preferable examples of the composite material include SiC/C and SiC/Al. Only one type thereof may be used, or two or more types may be used in combination.

(Heat-Generating Cell)

A plurality of heat-generating cells (C) partitioned by a virtual boundary line (B) are arranged side by side on the base body (2). An array method of the heat-generating cells (C) is not limited, but examples of a basic configuration can include an array in which a plurality of heat-generating cells (C) are arranged side by side in one linear direction or in a circumferential direction of one circle (see FIGS. 2 and 3). A plurality of heat-generating cell groups having such a basic configuration may be disposed on one base body (2) (see FIG. 4).

Adjacent heat-generating cells (C) are separated with a gap interposed therebetween, and are electrically insulated. The boundary line (B) is a boundary line provided in design for partitioning the plurality of heat-generating cells (C) (see FIGS. 1 and 2). The boundary line (B) may be linear, curved, or wavy.

The boundary line (B) can be set in a direction perpendicular to the array direction (e.g., the one linear direction or the circumferential direction of the one circle) of the plurality of heat-generating cells (C). Furthermore, the boundary line (B) may be set inclined with respect to the array direction of the plurality of heat-generating cells (C). For example, when the heat-generating cell groups are arrayed in one linear direction, the boundary line (B) may be in a direction perpendicular to the one linear direction, or may be provided inclined at a predetermined angle with respect to the one straight line. For example, when the heat-generating cell groups are arrayed in a circumferential direction of one circle, the boundary line (B) may be in a radius direction of the one circle, or may be provided inclined at a predetermined angle with respect to the circumferential direction. The predetermined angle may be arbitrarily set according to the width of the heat-generating cell (C) (the size in the direction perpendicular to the array direction of the heat-generating cells) or the like, and may be, for example, 15 degrees to 90 degrees (or 90 degrees to 165 degrees), preferably 25 degrees to 65 degrees (or 115 degrees to 155 degrees), and more preferably 35 degrees to 55 degrees (or 125 degrees to 145 degrees) with respect to the array direction of the heat-generating cells.

When three or more heat-generating cells (C) are arrayed, the inclinations of the boundary lines (B) of the heat-generating cells with respect to the array direction of the heat-generating cells do not need to be the same angle, and the boundary lines (B) may be inclined at different angles. For example, when four heat-generating cells ($C_1$ to $C_4$) are arrayed, the boundary line (B) between $C_1$ and $C_2$ is inclined at 45 degrees, the boundary line (B) between $C_2$ and $C_3$ is inclined at 135 degrees, and the boundary line (B) between $C_3$ and $C_4$ is inclined at 45 degrees with respect to the array direction of the heat-generating cells $C_1$ to $C_4$.

(Resistive Heating Wire)

The heater (1) includes one resistive heating wire (3) that is formed in each heat-generating cell (C) and has a zig-zag shape as a whole, in which a parallel wiring ($L_1$), in which a plurality of wirings are formed in parallel, and a turn-back wiring ($L_2$) formed so as to turn back the parallel wiring ($L_1$) in the vicinity of a boundary line (B) between adjacent heat-generating cells are connected (see FIG. 1).

The zig-zag shape is, for example, a shape in which, in a case where three parallel wirings $L_1$ are designated as $L_{11}$, $L_{12}$, and $L_{13}$ in order, $L_{11}$ and $L_{12}$ are connected by a turn-back wiring $L_2$ at the respective one ends, and $L_{12}$ and $L_{13}$ are connected by a turn-back wiring $L_2$ at the respective other ends. In addition, in a case where four parallel wirings $L_1$ are designated as $L_{11}$, $L_{12}$, $L_{13}$, and $L_{14}$ in order, $L_{11}$ and $L_{12}$ are connected at respective one ends, $L_{12}$ and $L_{13}$ are connected at the respective other ends, and $L_{13}$ and $L_{14}$ are connected at respective one ends.

In the drawings, the corners of the portions where the wiring is bent, such as the connecting portion between the parallel wiring and the turn-back wiring and the extension portion, are drawn as being chamfered, but these corners do not need to be chamfered.

When a high TCR material (material having a high temperature coefficient of resistance) is selected as the wiring material of the resistive heating wire (3), the resistivity obtained by the material alone is low, and hence, a zig-zag shape in which parallel wiring and turn-back wiring are combined is used, and the resistance value is increased by making the wiring width narrow and making the wiring length long by the number of turn-back times, whereby the amount of heat generation required for a practical heater can be obtained.

In the resistive heating wire (3) having a zig-zag shape, the film thickness and the width of the wiring are preferably substantially the same in one heat-generating cell (C). The film thickness and the width of the wiring are preferably substantially the same for even different heat-generating cells (C). As a matter of course, in each heat-generating cell, the film thickness and the wiring width may be changed for the purpose of appropriately providing a temperature gradient, as necessary.

The wiring width and the inter-wiring distance (insulation distance) can be set as appropriate (e.g., in any case, 0.1 mm to 3.5 mm, preferably 0.3 mm to 2.0 mm, more preferably 0.4 mm to 1.2 mm).

The parallel wiring ($L_1$) is a wiring portion in which a plurality of resistive heating wires (3) are arranged substantially in parallel. The parallel wiring ($L_1$) is formed in a direction along the array direction of the plurality of heat-generating cells (C), that is, in a direction intersecting the boundary line (B). For example, when a plurality of heat-generating cells (C) are arrayed in one linear direction, the parallel wiring ($L_1$) is a plurality of wiring portions formed in a direction substantially parallel to the one straight line in one resistive heating wire. Furthermore, when a plurality of heat-generating cells (C) are arrayed in the circumferential direction of one circle, a plurality of wiring portions formed substantially concentrically in one resistive heating wire become the parallel wiring ($L_1$). When the entire resistive heating wire (3) has an arc shape (also includes an arc shape of an ellipse), the parallel wiring ($L_1$) may be wiring portions arranged so as to be substantially concentric.

Furthermore, the shape of the parallel wiring ($L_1$) is not limited to a linear shape and an arc shape, and may be a linear shape including one or more bent portions, a meandering curved shape, or another irregular straight line or curved line, and the parallel wiring ($L_1$) can be formed as long as a plurality of these wirings are arranged substantially in parallel.

Although the plurality of heat-generating cells (e.g., heat-generating cells C1 and C2) are arranged in one row, it is preferable that the parallel wirings $L_1$ of the heat-generating cells overlap each other when the parallel wirings $L_1$ are extended in the array direction of the heat-generating cells C. That is, it is preferable that the parallel wirings $L_1$ of the heat-generating cells C are on the same straight line for the parallel wirings $L_1$ of a linear shape and on the circumference of the same circle for the parallel wirings $L_1$ of an arc shape.

The turn-back wiring ($L_2$) is a wiring portion that connects ends of two adjacent parallel wirings ($L_1$) of the resistive heating wires (3) so that the two adjacent parallel wirings ($L_1$) form one turn-back shape to become a part of the zig-zag. When the number of parallel wirings ($L_1$) included in one heat-generating cell C is n, the number of turn-back wirings $L_2$ is usually n−1. When the heat-generating cell includes holes or other components, the number is not limited thereto.

An angle formed by the parallel wiring ($L_1$) and the turn-back wiring ($L_2$) is not limited. For example, the turn-back wiring ($L_2$) can be formed substantially parallel to the boundary line (B) with an adjacent heat-generating cell.

The inclination angle of the turn-back wiring ($L_2$) is not particularly limited, and may be, for example, an angle at which the turn-back wiring ($L_2$) is substantially parallel to the boundary line (B) (see FIG. 1). The plurality of turn-back wirings ($L_2$) included in the resistive heating wire (3) of one heat-generating cell (C) may have different inclination angles from each other with respect to the parallel wirings $L_1$, but preferably have substantially the same inclination angle.

At the upper end portion or the lower end portion of the heat-generating cell (C) in the direction of the boundary line (B), it is preferable to deform the turn-back wiring ($L_2$) or change the inclination angle so as to reduce a blank portion (non-heat generating portion) of the resistive heating wire (3) between the adjacent heat-generating cells (C). For example, when the heat-generating cells (C) are arrayed side by side in one linear direction, the turn-back wiring ($L_2$) can be formed substantially parallel to the one linear direction at the upper end portion or the lower end portion in the direction of the boundary line (B).

As a material of the resistive heating wire (3) constituting the heat-generating cell (C), a conductive material capable of generating heat according to a resistance value by energization can be used. Although the conductive material is not limited, for example, silver, copper, gold, platinum, palladium, rhodium, tungsten, molybdenum, rhenium (Re), ruthenium (Ru), or the like can be used. Only one type thereof may be used, or two or more types may be used in combination. When two or more types are used in combination, an alloy may be used. More specifically, a silver-palladium alloy, a silver-platinum alloy, a platinum-rhodium alloy, silver-ruthenium, silver, copper, gold, or the like can be used.

Each heat-generating cell (C) may have any resistance heating characteristic, but it is preferable that a self-temperature equalizing action (self-temperature complementing action) can be exhibited between the heat-generating cells. From this viewpoint, the conductive material constituting the resistive heating wire (3) preferably has a positive temperature coefficient of resistance. Specifically, the temperature coefficient of resistance in the temperature range of −200° C. or higher and 1000° C. or lower is preferably 100 ppm/° C. or larger and 4400 ppm/° C. or less, more preferably 300 ppm/° C. or larger and 3700 ppm/° C. or less, and particularly preferably 500 ppm/° C. or larger and 3000 ppm/° C. or less. Examples of such a material include silver-based alloys such as a silver-palladium alloy.

When a plurality of resistive heating wires (i.e., the heat-generating cell) formed using a conductive material having a positive temperature coefficient of resistance are electrically connected in parallel, the plurality of heat-generating cells exert self-temperature equalizing action. That is, for example, in a case where the second heat-generating cell is straddled between the first heat-generating cell and the third heat-generating cell, when the temperature of the second heat-generating cell lowers, heat is compensated by the first heat-generating cell and the third heat-generating cell. As a result of the supplement of heat, the current to the first heat-generating cell and the third heat-generating cell whose temperatures have lowered increases, and an action of autonomously recovering the temperature fall due to the heat taken is acted. That is, the heat-generating cells around the second heat-generating cell behave so as to complement the temperature fall of the second heat-generating cell. As described above, the heater including the plurality of resistive heating wires formed using the conductive material having the positive temperature coefficient of resistance is autonomously controlled so as to uniformly generate heat across the plurality of heat-generating cells.

Regarding a general metal material used for the resistive heating wire of the heater, for example, when silver (resistivity $\rho=1.62\times10^{-8}$ Ωm and temperature coefficient $\alpha=4.1\times10^{-3}$/° C. at 20° C.) is used, the temperature coefficient α is large, but the resistivity ρ is small, and thus it is difficult to set a high resistance value. Therefore, palladium ($\rho=10.8\times10^{-8}$ Ωm, $\alpha=3.7\times10^{-3}$/° C.) having a resistivity ρ larger than that of silver can be added, but the temperature coefficient α decreases even if the resistivity ρ increases. As described above, when a material having high TCR characteristics is selected, the resistivity tends to decrease. Therefore, in order to make the resistive heating wiring have a high TCR and a practical resistance value, it is necessary to increase the wiring length. It is possible to increase the wiring length and increase the resistance value by adopting the zig-zag shape.

The resistive heating wires (3) of the plurality of heat-generating cells (C) connected to a pair of electrodes can be electrically connected in parallel. The heat-generating cells connected in parallel can collectively perform heating control. Preferably, the heat-generating cells connected in parallel have substantially uniform electrical characteristics such as a resistance value and a resistance heating characteristic.

(Extension Portion)

The extension portion (31) is a portion formed such that one or both of the parallel wiring and the turn-back wiring of the resistive heating wire (3) constituting one heat-generating cell cross the boundary line (B). The resistive heating wire (3) of the heat-generating cell adjacent to that heat-generating cell has a portion (retracting portion) where the wiring is shortened or deformed so as to maintain electrical insulation in correspondence with the wiring pattern of the opposing extension portion. In the adjacent heat-generating cells (C), the resistive heating wires (3) are configured to include extension portions (31) alternately in the direction of the boundary line (B) (see FIG. 1). As a result, the periphery of the extension portion of one adjacent cell can be surrounded by the wiring of the other adjacent cell. Note that the corresponding parallel wirings and turn-back wirings of the extension portions (31) of the adjacent heat-generating cells are usually disposed in parallel, but this is not the sole case.

Figure 16:
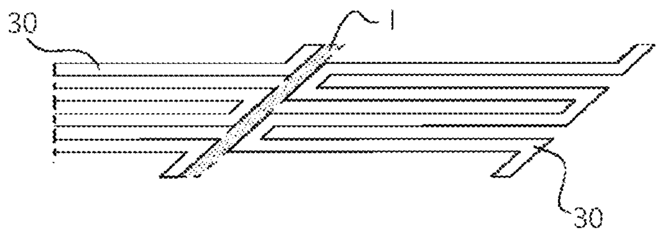
FIG. 16 is a plan view for explaining a non-wiring region between adjacent heat-generating cells in a conventional heater.

In order to arrange the plurality of heat-generating cells (C) side by side, it is necessary to form an insulation gap necessary for insulation between the heat-generating cells (C). Since there is no resistive heating wire (3) in the insulation gap, a blank of heat generating is generated. In particular, when the object-to-be-heated is swept in a direction orthogonal to the array direction of the heat-generating cells to be heated, the insulation gap is formed along the sweep direction, and a continuous thermal blank is formed in the sweep direction at the time of heating (see FIG. 16).

Therefore, the insulation gap does not become one line in the sweep direction, and the thermal blank portion can be dispersed in the direction orthogonal to the sweep by alternately providing the extension portions (31) of the resistive heating wires (3) in the direction of the boundary line (B) between the adjacent heat-generating cells (C). A thermal blank portion is generated between one extension portion and the other retracting portion of the adjacent heat-generating cells, but since the extension portion and the retracting portion are alternately disposed in the boundary line direction, the thermal blank portion is dispersed.

The wiring pattern and the length of the extension portion (31) are not particularly limited. In addition, the wiring pattern of the retracting portion of the adjacent heat-generating cell (C) provided in correspondence with the extension portion (31) is not limited, and only needs to be appropriately determined so as to reduce the gap with the wiring of the extension portion of one heat-generating cell and maintain electrical insulation.

The extension portion (31) can be provided inclined at a predetermined angle with respect to the boundary line (B). The parallel wiring and/or the turn-back wiring corresponding to the extension portion (31) can be bent or inclined with respect to each wiring other than the extension portion. The extension portion (31) straddles the boundary line (B), and may be formed so that all or a part thereof is inclined at a predetermined angle with respect to the boundary line (B). That is, the extension portion (31) may have a non-inclined portion, and for example, the extension portion may have an inclined portion and a non-inclined portion substantially parallel to the parallel wiring ($L_1$).

When the extension portion (31) is inclined with respect to the boundary line (B), the extension portion (31) is extended deeper past the boundary line (B), and the resistive heating wires of the adjacent heat-generating cells can have a mutually intertwined pattern at the boundary portion. As a result, it is possible to reduce a blank portion of heat generating and greatly suppress a temperature fall at the boundary portion.

The inclination angle of the extension portion (31) with respect to the boundary line (B) can be appropriately selected (e.g., 40 degrees to 140 degrees, preferably 60 degrees to 120 degrees, more preferably 80 degrees to 100 degrees).

(Curved Portion)

In the heater (1), the resistive heating wire (3) has a curved portion (33) on the parallel wiring ($L_1$), and the curved portion (33) can be formed in a convex shape toward a gap between the resistive heating wires (3) of the adjacent heat-generating cells (C) (see FIG. 1).

With the curved portion (33), heat generation at a portion where the wiring density of the resistive heating wire is lower than that at other portions (e.g., a gap between an extension portion of one heat-generating cell and a retracting portion of an adjacent heat-generating cell) can be increased.

The length of the curved portion (the length of the line segment connecting both ends thereof) and the protruding length of the convex shape are not particularly limited, and only need to be appropriately selected so as to fill the gap between the resistive heating wires.

Figure 2:
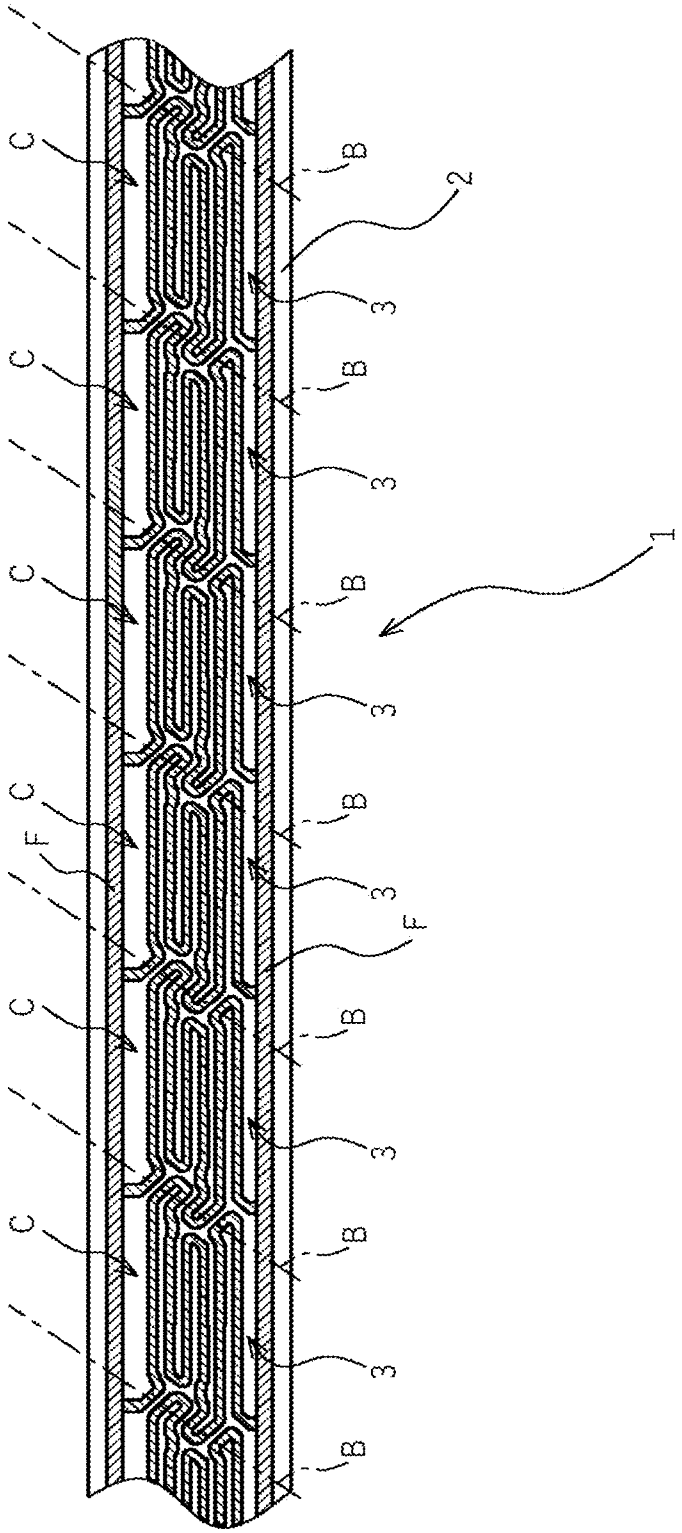
FIG. 2 is a schematic plan view illustrating an example of a heater in which heat-generating cells are linearly arrayed.

FIGS. 1 and 2 illustrate a heater 1 in which a plurality of heat-generating cells C partitioned by a boundary line B are arranged side by side in one linear direction (long side direction of the base body 2) on the rectangular base body 2. The boundary line B between the adjacent heat-generating cells C is inclined at a constant angle with respect to the one straight line.

In each heat-generating cell C, a parallel wiring $L_1$ in which a plurality of wirings are formed in parallel and a turn-back wiring $L_2$ formed so as to turn back the parallel wiring $L_1$ in the vicinity of the boundary line B between the adjacent heat-generating cells C are connected to form one resistive heating wire 3 having a zig-zag shape as a whole.

In this example, the turn-back wiring $L_2$ is formed substantially parallel to the boundary line B.

In the adjacent heat-generating cells C, the resistive heating wire 3 of one heat-generating cell C has an extension portion 31 formed so as to extend the parallel wiring $L_1$ past the boundary line B, and the wiring of the resistive heating wire 3 of the other heat-generating cell C has a retracting portion 32 shortened in correspondence with the extension portion 31. The resistive heating wires 3 of the adjacent heat-generating cells include extension portions 31 alternately in the direction of the boundary line B. Furthermore, the extension portion 31 is provided so as to straddle the boundary line B and to be inclined at a constant angle with respect to the boundary line B as a whole.

In addition, the resistive heating wire 3 has a curved portion 33 on the parallel wiring $L_1$, and the curved portion 33 is formed in a convex shape toward a gap between the resistive heating wires 3 of the adjacent heat-generating cells C.

In the heater 1, the resistive heating wires 3 of the heat-generating cells C are electrically connected in parallel by a pair of power supply wirings F. The base body 2 has a narrow width, and it is suitable for an application of heating an object-to-be-heated by relatively sweeping the base body 2 and the object-to-be-heated in a short side direction of the base body 2. Since the extension portions 31 are alternately arranged in the direction of the boundary line B, a thermal blank portion where there is no wiring of the resistive heating wire 3 is dispersed between the adjacent heat-generating cells.

Figure 3:
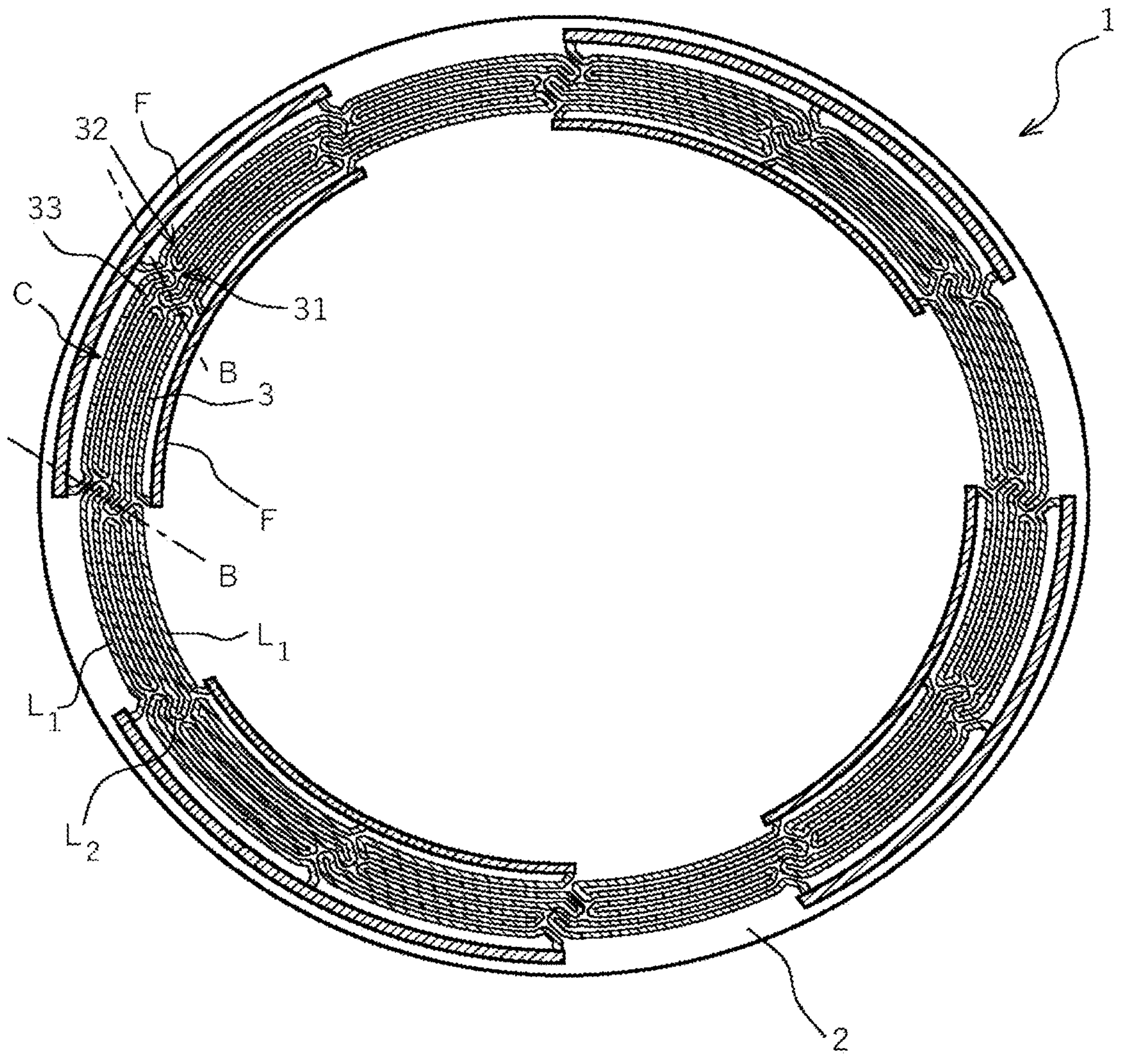
FIG. 3 is a schematic plan view illustrating an example of a heater in which heat-generating cells are arrayed in a circular shape.

FIG. 3 illustrates the heater 1 in which a plurality of heat-generating cells C partitioned by the boundary line B are arranged side by side in the circumferential direction of one circle on the circular base body 2. In this example, the boundary line B between the adjacent heat-generating cells C is inclined at a constant angle with respect to a line segment that equally divides the one circle around the center.

In the resistive heating wire 3 of each heat-generating cell C, a plurality of parallel wirings $L_1$ arranged in parallel concentrically and a turn-back wiring $L_2$ formed so as to turn back the parallel wirings $L_1$ in the vicinity of the boundary line B between the adjacent heat-generating cells C are connected to form a zig-zag shape as a whole.

In addition, the heater of this example is configured similarly to that illustrated in the previous drawing.

Figure 4:
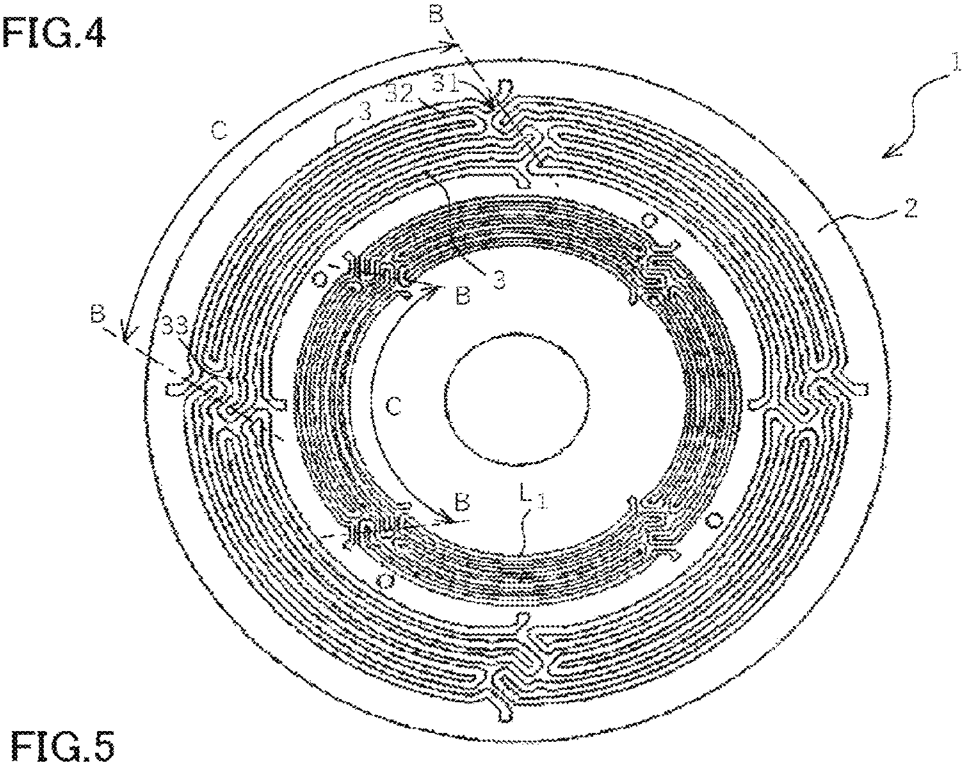
FIG. 4 is a schematic plan view illustrating an example of a heater provided with two sets of heat-generating cell groups arrayed in a circular shape.

FIG. 4 illustrates an example in which two sets of a plurality of heat-generating cell C groups arranged side by side in the circumferential direction are provided on a circular base body 2.

Figure 5:
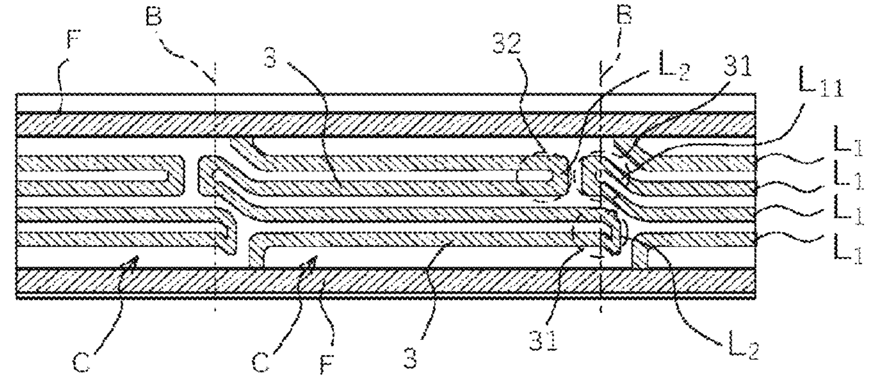
FIG. 5 is a schematic plan view illustrating a wiring example of a resistive heating wire.

FIG. 5 illustrates the heater 1 in which the plurality of heat-generating cells C partitioned by the boundary line B are arranged side by side in the long side direction of the rectangular base body 2 on the base body 2. The boundary line B between the adjacent heat-generating cells C is set in a direction perpendicular to the array direction of the plurality of heat-generating cells C. Other configurations are similar to those of the heater illustrated in FIG. 1.

Figure 6:
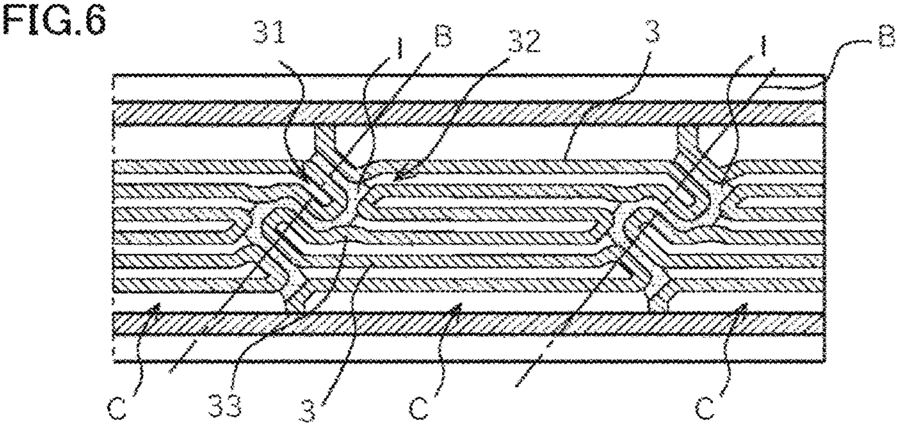
FIG. 6 is a plan view for explaining a non-wiring region between adjacent heat-generating cells.

FIG. 6 is a diagram for explaining a non-wiring portion I of the resistive heating wire 3 generated between the adjacent heat-generating cells C. The non-wiring portions I can be dispersed in the array direction of the heat-generating cells C by the wiring pattern of the resistive heating wire 3 of the present heater.

Figure 7:
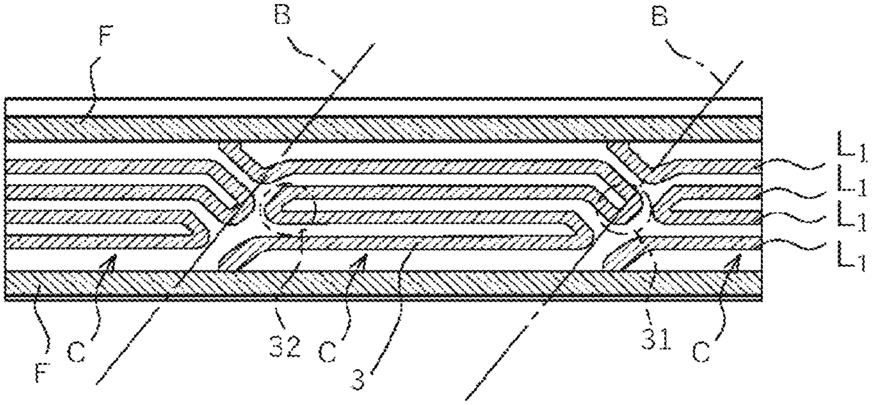
FIG. 7 is a schematic plan view illustrating another wiring example of the resistive heating wire.
Figure 8:
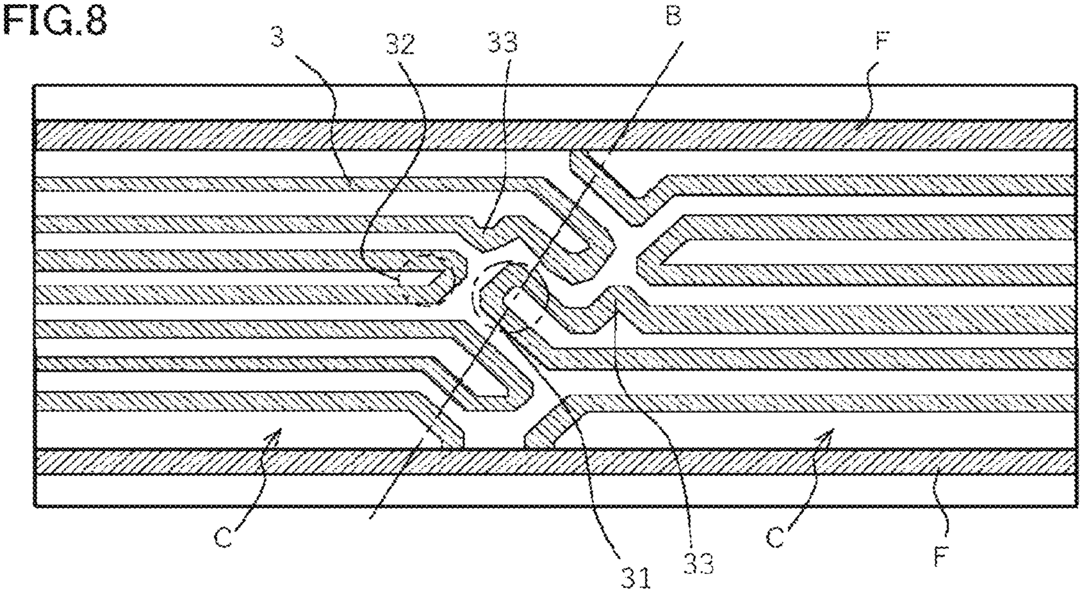
FIG. 8 is a schematic plan view illustrating another wiring example of the resistive heating wire.

FIGS. 7 and 8 illustrate wiring examples in a case where the number of parallel wirings $L_1$ constituting the resistive heating wire 3 is four and eight, respectively. As illustrated in FIG. 7, even when the resistive heating wires 3 of the adjacent heat-generating cells C cannot alternately include the extension portions 31 in the direction of the boundary line B, a similar effect can be obtained by reducing the non-wiring portions between the adjacent heat-generating cells C as much as possible and deforming the wiring so as to disperse the non-wiring portions in the array direction of the heat-generating cells C.

Figure 9:
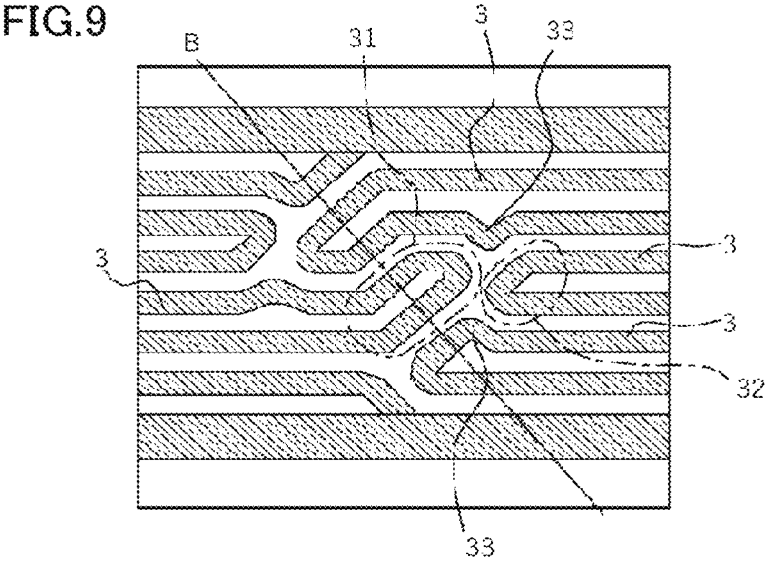
FIG. 9 is a schematic plan view illustrating a modified example of a wiring of the resistive heating wire.
Figure 10:
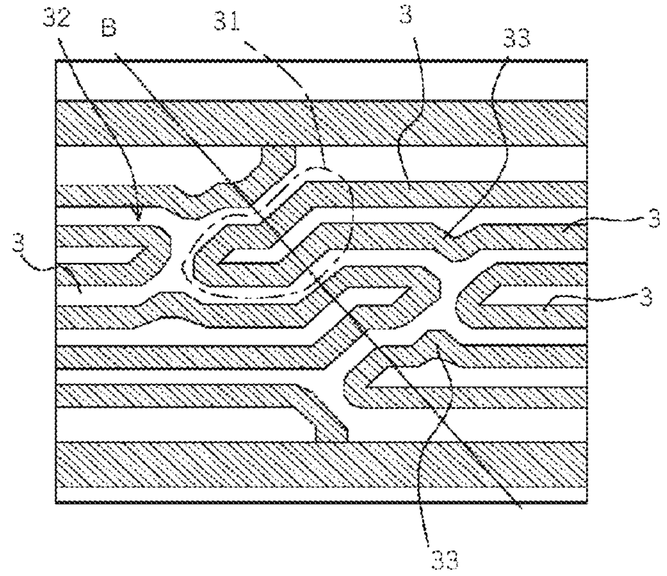
FIG. 10 is a schematic plan view illustrating another modified example of the wiring of the resistive heating wire.

FIGS. 9 and 10 each illustrate a modified example of the wiring pattern of the resistive heating wire 3 between the adjacent heat-generating cells C. In this manner, in response to the wiring pattern of the extension portion 31 formed in the resistive heating wire 3 of one heat-generating cell C, the wiring pattern of the retracting portion 32 formed in the resistive heating wire 3 of the other heat-generating cell C can be arbitrarily changed. As illustrated in both drawings, in the extension portion 31 and the retracting portion 32 of the adjacent heat-generating cells C, the respective turn-back wirings $L_2$ can have an arbitrary inclination angle with respect to the boundary line B. In addition, as illustrated in FIG. 10, the extension portion 31 may straddle the boundary line B, a part thereof may be inclined at a certain angle with respect to the boundary line B, and the other part may be in a direction parallel to the array direction of the heat-generating cells C. Furthermore, the turn-back wiring $L_2$ may be provided in a direction parallel to the array direction of the heat-generating cells C, or may be turned back in a hairpin-form.

Figure 11:
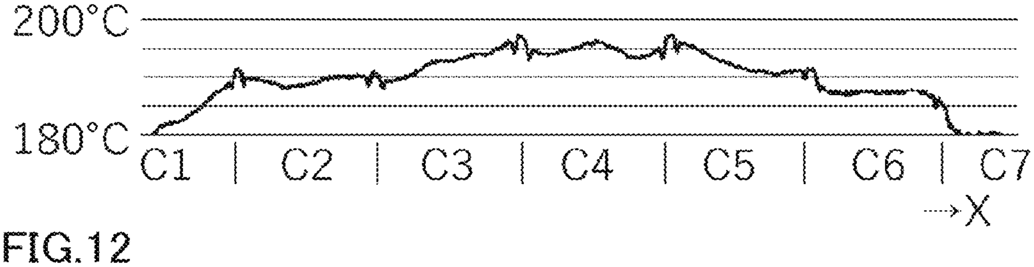
Figure 12:
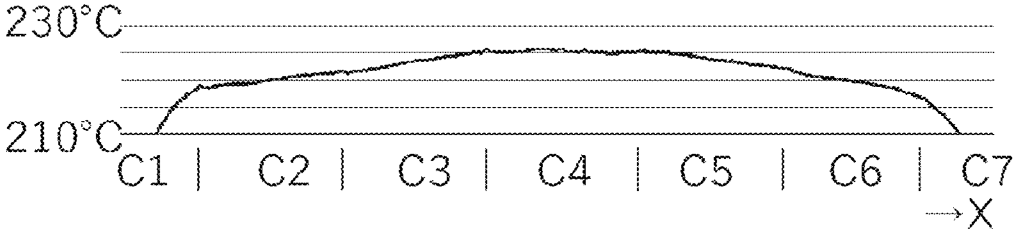
FIG. 12 is a graph showing an example of temperature distribution at the time of use of the heater.

FIGS. 11 and 12 illustrate temperature profiles measured using a heater in which seven heat-generating cells C1 to C7 are arrayed in the direction of a straight line X. FIG. 11 is a temperature profile immediately after a voltage is applied to the heater (after about 12 seconds), and it can be seen that the temperature at the boundary portion of each heat-generating cell reaches the heater use temperature immediately after the power is turned on as an effect of the resistive heating wire pattern in which the extension portion is provided between the heat-generating cells. Furthermore, FIG. 12 is a temperature profile when the temperature of the heater reaches a reference after a voltage is applied to the heater, and a high heat uniformity is obtained in the entire heater.

The heater (1) is incorporated in an image formation device such as a printing machine, a copying machine, or a facsimile, a fixing device, or the like, and can be used as a fixing heater for fixing toner, ink, or the like to a recording medium. Furthermore, it can be used as a heating device that is incorporated in a heating machine and that uniformly heats (dries, fires, etc.) a processing body such as a panel. In addition, heat treatment of a metal product, heat treatment of a coated film and coating film formed on a base body having various shapes, and the like can be suitably performed. Specifically, it can be used for heat treatment of a coated film (filter constituent material) for flat panel displays, paint drying of painted metal products, automobile-related products, wooden products, and the like, electrostatic flocking adhesion drying, heat treatment of plastic processed products, solder reflow of printed substrates, print drying of thick film integrated circuits, and the like.

2. Fixing Device

The fixing device including the present heater can have a configuration appropriately selected according to a material and a shape of an object-to-be-heated, a fixing means, and the like. For example, in a case where a fixing means involving pressure bonding is provided to fix toner or the like to a recording medium such as paper, or in a case where a plurality of members are bonded to each other, a fixing device including a heating unit equipped with a heater and a pressurizing unit can be provided. Of course, a fixing means that does not involve pressure bonding can be provided. In the present invention, the fixing device is preferably a fixing device 5 that fixes an unfixed image including toner formed on a surface of a recording medium such as paper or a film to the recording medium.

Figure 13:
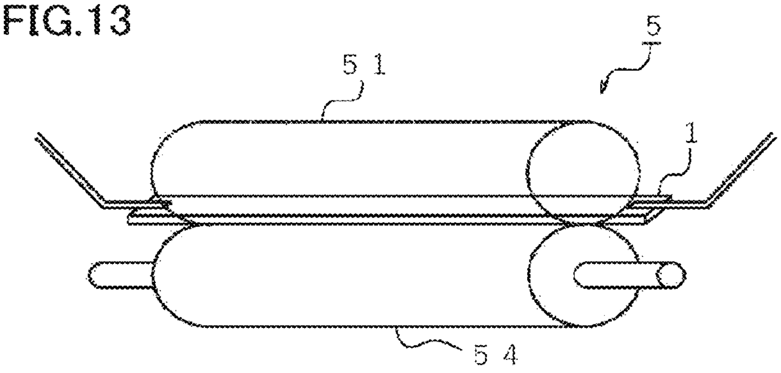
FIG. 13 is a schematic perspective view illustrating an example of a fixing device using the heater.

FIG. 13 illustrates a main part of the fixing device 5 disposed in an electrophotographic type image formation device. The fixing device 5 includes a rotatable fixing roll 51 and a rotatable pressurizing roll 54, and the heater 1 is disposed inside the fixing roll 51. The heater 1 is preferably disposed so as to be close to the inner surface of the fixing roll 51.

The heater 1 may have a structure of, for example, being fixed inside a heater holder 53 made of a material capable of conducting heat generated by the heater 1 like the fixing means 5 illustrated in the drawing, and transmitting the heat generated by the heater 1 from the inner side of the fixing roll 51 to the outer surface.

Figure 14:
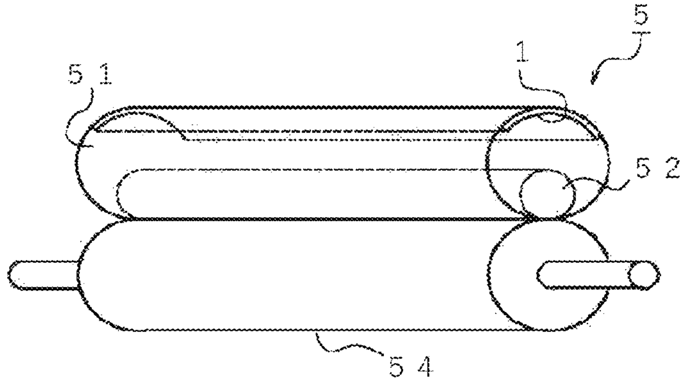
FIG. 14 is a schematic perspective view illustrating another example of the fixing device using the heater.

FIG. 14 also illustrates a main part of the fixing device 5 disposed in an electrophotographic type image formation device. The fixing device 5 includes a rotatable fixing roll 51 and a rotatable pressurizing roll 54, and the heater 1 that transfers heat to the fixing roll 51 and a fixing pad 52 that pressure-contacts the recording medium together with the pressurizing roll 54 are disposed inside the fixing roll 51. The heater 1 is disposed along the cylindrical surface of the fixing roll 51.

In the fixing device 5 illustrated in the drawing, the heater 1 is caused to generate heat by applying a voltage from a power supply device (not illustrated), and the heat is transmitted to the fixing roll 51. Then, when a recording medium having an unfixed toner image on the surface thereof is supplied between the fixing roll 51 and the pressurizing roll 54, the toner melts at a pressure contact portion between the fixing roll 51 and the pressurizing roll 54 to form a fixed image. Since the pressure contact portion of the fixing roll 51 and the pressurizing roll 54 is provided, the rolls rotate together. As described above, since the heater 1 suppresses a local temperature rise that is likely to occur when a small recording medium is used, temperature unevenness in the fixing roll 51 is less likely to occur, and fixing can be uniformly performed. Furthermore, even immediately after the start of use of the fixing device, uniformity of adjacent portions of the heat-generating cells of the heater 1 is excellent, and hence a fixing result substantially similar to that at the time of continuous use can be obtained.

Another aspect of the fixing device including the present heater 1 may be an aspect of being a die including an upper die and a lower die, in which the heater is disposed inside at least one of the upper die and the lower die.

The fixing device including the present heater 1 is suitable as a heat source for heating, heat retention, and the like by being mounted on an image formation device such as an electrophotographic type printing machine and a copying machine, household electrical products, commercial precision equipment, experimental precision equipment, and the like.

3. Image Formation Device

An image formation device including the present heater can have a configuration appropriately selected according to an object-to-be-heated, a heating purpose, or the like. In the present invention, as illustrated in the drawings, it is preferable that an image formation device 4 includes an image creating means that forms an unfixed image on a surface of a recording medium such as paper or a film, and a fixing means 5 that fixes the unfixed image to the recording medium, and the fixing means 5 includes the present heater 1. In addition to the above means, the image formation device 4 can be configured to include a recording medium conveying means and a control means for controlling each means.

Figure 15:
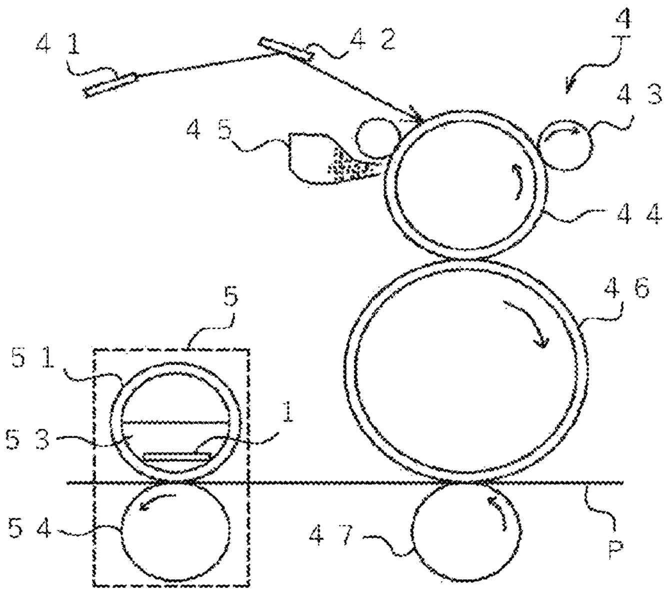
FIG. 15 is a schematic view illustrating an example of an image formation device using the heater.

FIG. 15 is a schematic view illustrating a main part of the image formation device 4 of electrophotographic type. The image creating means may be of either a type including a transfer drum or a type not including a transfer drum, but FIG. 15 illustrates an aspect including a transfer drum.

In the image creating means, while rotating, an electrification processed surface of a photosensitive drum 44 subjected to an electrification process to a predetermined potential by an electrification device 43 is irradiated with a laser output from a laser scanner 41, and an electrostatic latent image is formed by the toner supplied from a developing device 45. Next, the toner image is transferred to the surface of the transfer drum 46 that moves in cooperation with the photosensitive drum 44 using the potential difference. Thereafter, the toner image is transferred to the surface of the recording medium supplied between a transfer drum 46 and the transfer roll 47, and a recording medium having an unfixed image is obtained. The toner is particles containing a binder resin, a colorant, and an additive, and the melting temperature of the binder resin is usually 90° C. to 250° C. Note that a cleaning device for removing insoluble toner and the like can be provided on the surfaces of the photosensitive drum 44 and the transfer drum 46.

The fixing means 5 can have a configuration similar to that of the fixing device 5, and includes a pressurizing roll 54 and a fixing roll 51 that interiorly includes a heater holder 53 holding a sheet passing direction energization type heater 1 and that moves in cooperation with the pressurizing roll 54. The recording medium having the unfixed image from the image creating means is supplied to between the fixing roll 51 and the pressurizing roll 54. The heat of the fixing roll 51 melts the toner image on the recording medium, and the melted toner is further pressurized at a pressure contact portion between the fixing roll 51 and the pressurizing roll 54, so that the toner image is fixed on the recording medium. The fixing means 5 of FIG. 15 may be an aspect of including a fixing belt in which the heater 1 is disposed in proximity instead of the fixing roll 51.

In general, when the temperature of the fixing roll 51 becomes non-uniform and the heat quantity applied to the toner is too small, the toner is peeled off from the recording medium, whereas when the heat quantity is too large, the toner adheres to the fixing roll 51, and the fixing roll 51 may go around once and re-adhere to the recording medium. According to the fixing means 5 including the heater of the present invention, since the temperature is quickly adjusted to a predetermined temperature, problems can be suppressed. In addition, even immediately after the start of use of the fixing device, excellent uniformity is obtained as the thermal blanks of the adjacent portions of the heat-generating cells of the heater 1 are dispersed, and thus even if the recording medium passes (is swept), there is no place where overheating or insufficient heating occurs, and a fixing result substantially similar to that at the time of continuous use can be obtained.

The image formation device according to the present invention suppresses excessive temperature rise in a non-sheet passing region at the time of use, and is suitable as an electrophotographic type printing machine, a copying machine, or the like.

4. Heating Device

The heating device including the present heater may have a configuration appropriately selected according to the size, shape, and the like of the object-to-be-heated. In the present invention, for example, a housing portion, a sealable window portion disposed for taking in and out an object to be heat-treated, and a movable heater portion disposed inside the housing portion can be provided. If necessary, inside the housing portion, for example, an object-to-be-heat-treated installation portion for disposing the object to be heat-treated, an exhaust portion for discharging gas when gas is discharged by heating the object to be heat-treated, and a pressure adjusting portion such as a vacuum pump for adjusting the pressure inside the housing portion may be provided. In addition, the heating may be performed in a state where the object to be heat-treated and the heater portion are fixed, or may be performed while either one is moved.

The present heating device is suitable as a device for drying an object to be heat-treated containing water, an organic solvent, or the like at a desired temperature. It can be used as a vacuum dryer (depressurization dryer), a pressurization dryer, a dehumidifying dryer, a hot air dryer, an explosion-proof dryer, or the like. Furthermore, it is suitable as a device for firing an unfired product such as an LCD panel or an organic EL panel at a desired temperature. It can be used as a depressurization firing machine, a pressurization firing machine, or the like.

Note that the present invention is not limited to the specific embodiments described above, and various modifications can be made within the scope of the present invention depending on the purpose and use.

REFERENCE SIGNS LIST

1 Heater
2 Base body
3 Resistive heating wire
31 Extension portion
32 Retracting portion
33 Curved portion
4 Image formation device
41 Laser scanner
42 Mirror
43 Electrification device
44 Photosensitive drum
45 Developing device
46 Transfer drum
47 Transfer roll
5 Fixing device (fixing means)
51 Fixing roll
52 Fixing pad
53 Heater holder
54 Pressurizing roll
B Boundary line
C Heat-generating cell
F Power supply wiring
$L_1$ Parallel wiring
$L_2$ Turn-back wiring

The invention claimed is:

1. A heater in which a plurality of heat-generating cells partitioned by a virtual boundary line are arranged side by side on a base body, the heater configured to heat an object-to-be-heated in a state of facing the base body, the heater comprising:

the base body; and one resistive heating wire formed in each of the heat-generating cells and having a zig-zag shape as a whole, the resistive heating wire being formed by connecting a parallel wiring in which a plurality of wirings are formed in parallel and a turn-back wiring formed so as to turn back the parallel wiring in a vicinity of the boundary line between adjacent ones of the heat-generating cells; wherein in the adjacent ones of the heat-generating cells, the resistive heating wire of one of the heat-generating cells has an extension portion formed so as to extend the parallel wiring past the boundary line, and the resistive heating wire of the other of the heat-generating cells is shortened or deformed so that a wiring of a portion facing the extension portion maintains an electrical insulation with the extension portion; and the resistive heating wires of the adjacent ones of the heat-generating cells include the extension portions alternately along the boundary line such that a periphery of the extension portion of the one of the adjacent heat-generating cells is surrounded by peripheries of the extension portions of the other of the heat-generating cells along the boundary line.

2. The heater according to claim 1, wherein the extension portion of the resistive heating wire straddles the boundary line, and a whole or a part of the extension portion is provided inclined at a predetermined angle with respect to the boundary line.

3. The heater according to claim 1, wherein the resistive heating wire has a curved portion in the parallel wiring, and the curved portion is formed in a convex shape toward a gap between the resistive heating wires of the adjacent ones of the heat-generating cells.

4. The heater according to claim 1, wherein the plurality of heat-generating cells are arranged side by side in one linear direction along a straight line.

5. The heater according to claim 4, wherein the boundary line between the adjacent ones of the heat-generating cells is inclined at a predetermined angle with respect to the straight line.

6. The heater according to claim 4, wherein the resistive heating wire has a curved portion in the parallel wiring, and the curved portion is formed in a convex shape toward a gap between the resistive heating wires of the adjacent ones of the heat-generating cells.

7. The heater according to claim 4, wherein the turn-back wiring is formed in parallel with the straight line at an upper end portion or a lower end portion in the boundary line direction.

8. The heater according to claim 4, wherein the base body and the object-to-be-heated are relatively swept in a direction perpendicular to the straight line to heat the object-to-be-heated.

9. The heater according to claim 1, wherein the plurality of heat-generating cells are arranged side by side in a circumferential direction of one circle.

10. The heater according to claim 9, wherein the boundary line between adjacent ones of the heat-generating cells equally divides the one circle around a center.

11. The heater according to claim 9, wherein the boundary line between the adjacent ones of the heat-generating cells is inclined at a predetermined angle with respect to a line segment that equally divides the one circle around the center.

12. A fixing device comprising the heater according to claim 1.

13. An image formation device comprising the heater according to claim 1.

14. A heating device comprising the heater according to claim 1.

15. The heater according to claim 1, wherein the parallel wiring extended to form the extension portion has an inclined portion that is inclined with respect to an arrangement direction of the plurality of heat-generating cells.

16. A heater in which a plurality of heat-generating cells partitioned by a virtual boundary line are arranged side by side on a base body, the heater configured to heat an object-to-be-heated in a state of facing the base body, the heater comprising:

the base body; and one resistive heating wire formed in each of the heat-generating cells and having a zig-zag shape as a whole, the resistive heating wire being formed by connecting a parallel wiring in which a plurality of wirings are formed in parallel and a turn-back wiring formed so as to turn back the parallel wiring in a vicinity of the boundary line between adjacent ones of the heat-generating cells; wherein in the adjacent ones of the heat-generating cells, the resistive heating wire of one of the heat-generating cells has an extension portion formed so as to extend the parallel wiring past the boundary line, and the resistive heating wire of the other of the heat-generating cells is shortened or deformed so that a wiring of a portion facing the extension portion maintains an electrical insulation with the extension portion;

the resistive heating wires of the adjacent ones of the heat-generating cells include the extension portions alternately along the boundary line; and the extension portion includes turn-back wiring connected to wiring that is inclined with respect to an arrangement direction of the plurality of heat-generating cells.

* * * * *